United States Patent [19]

Hitt

[11] 4,271,881
[45] Jun. 9, 1981

[54] DRIVING INTERFACE FOR VENEER CHUCK ASSEMBLY

[75] Inventor: George F. Hitt, Arcata, Calif.

[73] Assignee: Geurt Kreutzelman, Eugene, Oreg.

[21] Appl. No.: 65,660

[22] Filed: Aug. 10, 1979

[51] Int. Cl.³ .................... B27C 7/04; B27L 5/00
[52] U.S. Cl. ..................... 144/209 R; 82/40 R; 142/53
[58] Field of Search ............. 82/40 R, 33 R; 142/53, 142/55; 144/209 R

[56] References Cited

U.S. PATENT DOCUMENTS

| | | | |
|---|---|---|---|
| 891,602 | 6/1908 | DeMarey | 82/33 R |
| 2,879,816 | 3/1959 | Cook et al. | 144/209 R |
| 3,044,511 | 7/1962 | Wieckman et al. | 144/209 R |
| 3,140,628 | 7/1964 | Binns | 82/40 R |
| 3,221,787 | 12/1965 | Hitt | 144/209 R |
| 3,323,566 | 6/1967 | Hitt | 142/53 |
| 4,141,397 | 2/1979 | Schmidt | 144/209 R |

Primary Examiner—Leonidas Vlachos
Attorney, Agent, or Firm—Townsend and Townsend

[57] ABSTRACT

This invention relates to a chuck assembly for use with veneer lathes. In veneer lathes, a log is rotated against a blade for stripping a thin sheet of wood called veneer. Rotation of the log against the blade is compelled by paired chuck assemblies at opposite ends of the log. Each chuck assembly includes a spindle adapter and a chuck, both for driving rotation about the axis of rotation of the log. An improved driving interface between the spindle adapter and chuck is disclosed, extending along a plane normal to the axis of rotation. The chuck has a driving interface along a plane normal to the axis of rotation. This chuck driving interface defines keys, which keys preferably extend radially from the axis of rotation and protrude outwardly interrupting the plane of the driving interface. The spindle adapter has a complementary driving interface along a similar plane normal to the axis of rotation. The spindle adapter driving interface defines mating keyways, which keyways preferably extend radially from the axis of rotation and protrude inwardly interrupting the plane of the driving interface. When the driving interfaces are juxtaposed with the keys and keyways engaged, the rotation of the lathe imparted to the spindle adapter passes through the chuck assembly. Because of the driving interface, the chuck assembly may be constructed to a smaller diameter enabling veneer to be stripped from logs turned to a small diameter.

6 Claims, 4 Drawing Figures

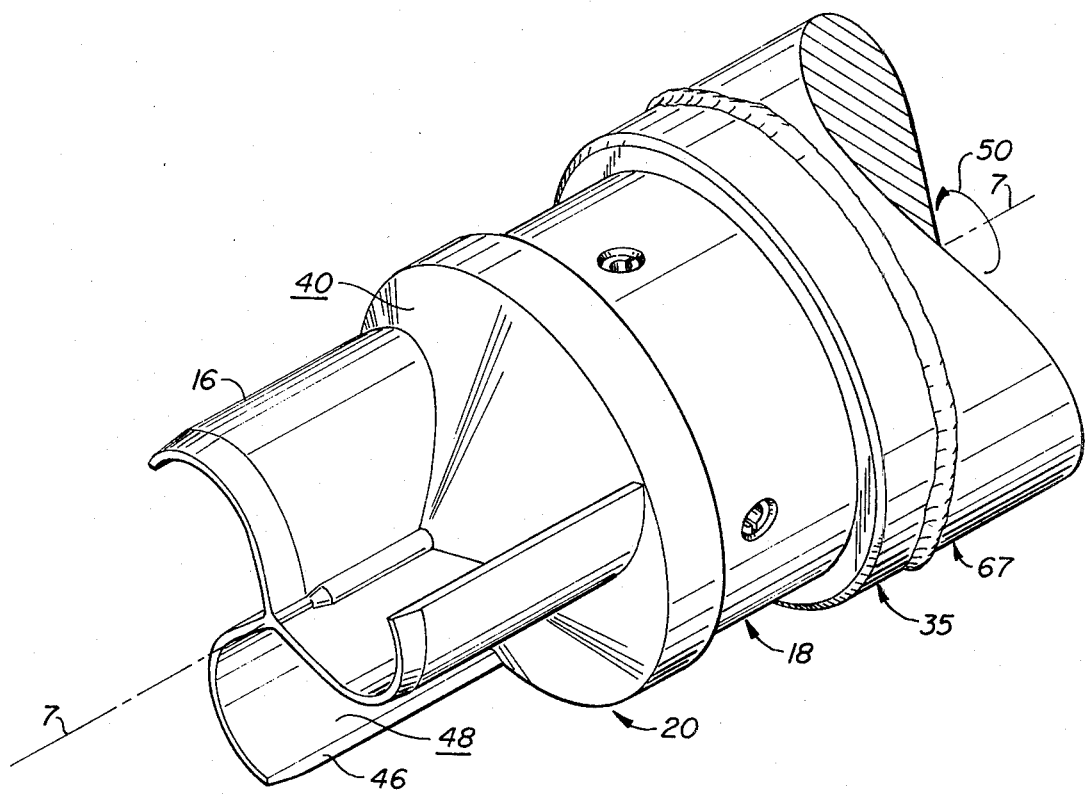
FIG._1.
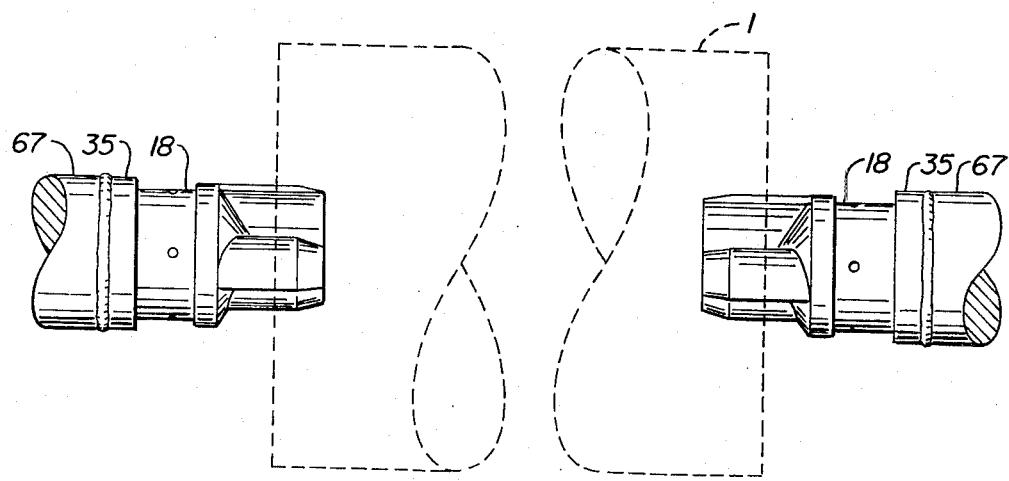
FIG._3.

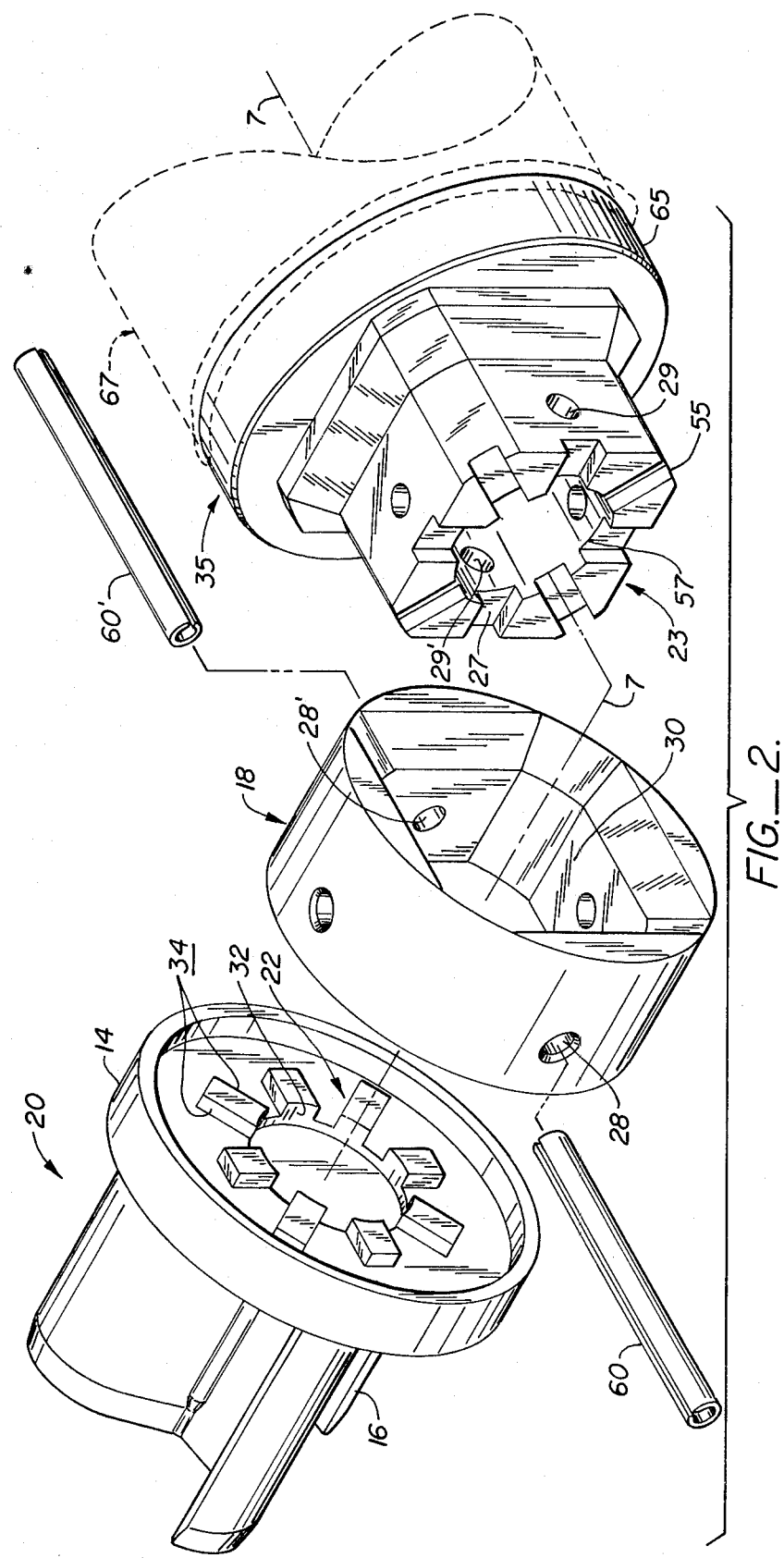

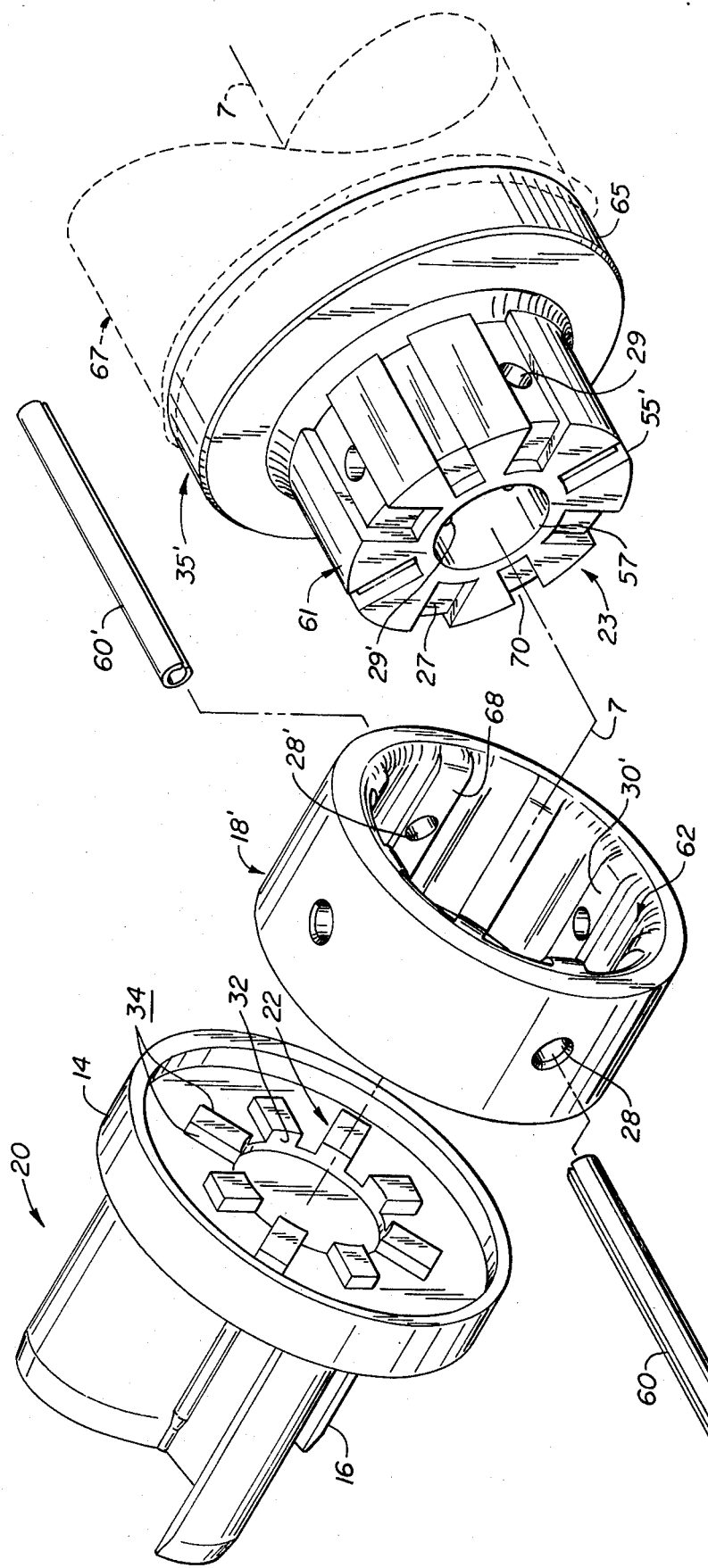
FIG._4.

DRIVING INTERFACE FOR VENEER CHUCK ASSEMBLY

This invention relates to a chuck assembly used to hold logs on veneer cutting lathes. More particularly, this invention includes an improved veneer chuck assembly having improved rotational couplings between a spindle adapter and chuck.

SUMMARY OF THE PRIOR ART

In veneer lathes, the log is rotated against the lathe for stripping a thin sheet of wood from the log called veneer. Rotation of the log against the blade is compelled by paired chuck assemblies at opposite ends of the log. Various chuck assemblies including spindle adapters and chucks and means of engagement have been proposed in the prior art. See for example U.S. Pat. Nos. 891,602; 2,879,816; 3,044,511; 3,221,787; 3,323,566; 4,141,397.

In such chuck assemblies, it has been found particularly advantageous to have a spindle adapter for attachment to the rotating portion of the lathe and a chuck assembly for driving the log. The engagement of these two members has of late become more difficult.

Typically, and because of the scarcity of the wood resource, the modern tendency is to turn veneer from logs until the logs reach increasing smaller diameter. The chuck naturally cannot exceed the smallest diameter to which the log is turned. Thus the chuck must be smaller than or at least equal to the smallest diameter to which the log is turned.

Heretofore, driving of chucks from spindle adapters has been accomplished by driving surfaces extending parallel to the axis of rotation. In a typical embodiment, the chuck assembly includes a collar extending cylindrically from the chuck assembly and defining therein a square female aperture. The spindle adapter includes a similarly square and mating male member. This similarly square and mating male member engages the collar attached to the chuck and imparts rotation from the lathe to the log.

As the chucks have become smaller in diameter, so have the collars and driving members. These smaller collars and smaller driving members wear and break. Typical of such breakage are fractures propagating in the collar from points defining rapid changes of curvature. Such a point is the corners of the square aperture in the collar. As the collars and driving members have become of increasingly smaller diameter, the tendency for such fracture and breakage has increased.

SUMMARY OF THE INVENTION

This invention relates to a chuck assembly for use with veneer lathes. In veneer lathes, a log is rotated against a blade for stripping a thin sheet of wood called veneer. Rotation of the log against the blade is compelled by paired chuck assemblies at opposite ends of the log. Each chuck assembly includes a spindle adapter and a chuck, both for driving rotation about the axis of rotation of the log. An improved driving interface between the spindle adapter and chuck is disclosed, extending along a plane normal to the axis of rotation. The chuck has a driving interface along a plane normal to the axis of rotation. This chuck driving interface defines keys, which keys preferably extend radially from the axis of rotation and protrude outwardly interrupting the plane of the driving interface. The spindle adapter has a complementary driving interface along a similar plane normal to the axis of rotation. The spindle adapter driving interface defines mating keyways, which keyways preferably extend radially from the axis of rotation and protrude inwardly interrupting the plane of the driving interface. When the driving interfaces are juxtaposed with the keys and keyways engaged, the rotation of the lathe imparted to the spindle adapter passes through the chuck assembly. Because of the driving interface, the chuck assembly may be constructed to a smaller diameter enabling veneer to be stripped from logs turned to a small diameter.

OTHER OBJECTS, FEATURES AND ADVANTAGES

An object of this invention is to disclose an improved driving interface between a spindle adapter on one hand and a chuck on the other. According to this aspect of the invention, the spindle adapter terminates in a plane substantially normal to its axis of rotation. Both of these planes are interrupted by complementary keys and keyways. Preferably, keys and keyways extend radially and are configured for mating engagement with the keys protruding outwardly from the chuck into receiving keyways in the spindle adapter. Upon juxtaposition of the members at their driving interface, torque is readily transmitted between the spindle adapter and chuck.

An advantage of the improved driving interface is that it is particularly adaptable to chucks and spindle adapters of small diameter.

A further advantage of the improved driving interface is that where the keys and keyways extend radially, the resultant engagement between the chuck and spindle adapter is self-centering. Reliance on a peripheral collar extending between th chuck and spindle adapter for the transmission of the torque between the two is no longer required, but may be used if so desired.

Yet another advantage of the improved driving interface is that when the chuck is driven through the improved driving interface only, any kind of collar extending between the chuck and spindle adapter only need be strong enough to hold the two members together in the absence of an engaged log.

A still further advantage which results when the chuck is driven through the improved driving interface only is that torque is transmitted only from the end of the spindle adapter to the chuck. Torque transmission through a collar attached to the chuck does not occur.

Yet an additional advantage of the improved driving interface is that any one of the prior art techniques utilized for holding a chuck to a spindle adapter can be used. For example, and in my prior invention set forth in Cook and Hitt U.S. Pat. No. 2,879,816, a system of pins extending through either the chuck or the spindle adapter to engage respectively the spindle adapter and/or chuck can be used.

Another object of the invention is to disclose an improved chuck driving interface coupled with a cylindrical driving interface extending parallel to the axis of rotation.

An advantage of this object is that higher rotational forces can generally be transmitted for the same size chuck and collar thickness than is possible using either the improved chuck driving interface or the cylindrical driving interface alone.

A further object of this invention is to disclose improved log engaging teeth of a veneer chuck. According to this aspect of the invention, arcuate teeth are defined about the axis of rotation. Preferably, these arcuate teeth commence at a point coaxial to the axis of rotation and are concave to the wood surface in the direction of rotation.

An advantage of these arcuate teeth is that fracture of the log along natural and radially extending fracture zones is avoided. The arcuate contour of the teeth engage the log along non-radially extending zones where fracture is resistant.

A further advantage of the arcuate teeth disclosed in this invention is that they can incorporate a self-cleaning feature by having the edges of the teeth longitudinally terminate along an outwardly and rearwardly sloping line of intersection. This line starts at the axis of rotation and extends both radially outwardly and longitudinally away from the gripping edge of the tooth. This provides an outwardly and rearwardly sloping self-cleaning surface. With this configuration, portions of the log which might otherwise stick to the driving chuck can be rapidly dislodged enabling successive logs to be rapidly processed.

Other objects, features and advantages of this invention will become more apparent after referring to the following specification and attached drawings in which:

BRIEF DESCRIPTION OF THE FIGURES

FIG. 1 is an isometric drawing of the chuck assembly;

FIG. 2 is an exploded isometric drawing of the chuck assembly;

FIG. 3 is a drawing showing a pair of chuck assemblies with a log shown in broken lines therebetween; and FIG. 4 is an alternative embodiment having two driving interfaces. The first is defined by keys and keyways normal to the axis of rotation. The second is defined by splines extending parallel to the axis of rotation.

DETAILED DESCRIPTION OF A PREFERRED EMBODIMENT

A first embodiment, which uses only the improved driving interface to drive a chuck 20, is shown at FIG. 2. It will be discussed first. A second embodiment, shown at FIG. 4, will be described later.

Referring to FIGS. 1, 2 and 3, a portion of a lathe spindle 67, spindle adapter 35, ring 18, chuck 20 and log 1 are illustrated. In this invention the lathe spindle 67, shown welded to the spindle adapter 35, drives the spindle adapter 35. In this first preferred embodiment, the spindle adapter 35 drives the chuck 20 by the engagement of their respective driving interfaces 22, 23. The collar 18, in this embodiment, is used merely to hold the chuck 20 to the spindle adapter 35 and is not used to transmit torque. The chuck 20 has three arcuate teeth 46 which engage the log 1 by being pressed into the ends of the log 1. As can be seen from FIG. 3, a pair of driven chuck assemblies are used to hold the log 1 in veneer cutting operations. A more detailed discussion of the spindle adapter 35, chuck 20, collar 18 with special emphasis on the driving interfaces 22, 23 follows.

Referring to FIG. 2, spindle adapter 35 is shown have a spindle end (or lathe driven portion) 65 and a driving end (or chuck engaging portion) 55. The spindle adapter 35 is shown welded to the lathe spindle 67 (shown in broken lines) at the spindle end 65.

The driving end 55 defines a generally square male member with holes 29, 29' formed through opposing sides of the square male member. Although the male member is shown with a square cross-section, it could also be some other shape, such as circular, since in this embodiment rotational force is transmitted only through driving interfaces 22, 23. The axes of holes 29, 29' are colinear and are normal to the axis of rotation 7. Holes 29, 29' are used for holding the chuck 20 to the spindle adapter 35 as more particularly described below.

At the terminus of the driving end 55 are a number of keyways 27. It should be noted that these keyways 27 lie in a plane normal to the axis of rotation 7 and define the spindle adapter driving interface 23. As described below, this driving interface 23 mates with a complementary driving interface 22 on the chuck 20 and serves as the means for transmitting rotational force from spindle adapter 35 to chuck 20. In this preferred embodiment spindle adapter 35 defines a cylindrical void 57 having a longitudinal axis colinear with the axis of rotation 7.

The chuck 20 is shown having a driven end (or spindle adapter engaging portion) 14 and a log engaging portion 16. The driven end 14 defines a number of keys 32. These keys 32 lie in a plane normal to the axis 7 and define a chuck driving interface 22. This driving interface 22 is complementarily shaped to the spindle adapter driving interface 23. Therefore, when the two interfaces 22, 23 are juxtaposed, rotational force can be transmitted from the spindle adapter 35 to the chuck 20. This aspect of the invention eliminates the need to transmit force through a collar or side walls of the chuck thereby enabling the design of a small but strong chuck assembly. It should be noted that in the preferred embodiment keys 32 and keyways 27 extend radially outwardly from the axis 7. This produces a chuck which is self-centering. It should also be noted that in the preferred embodiment shown the sides of the keys 34, 34' lie in planes which are perpendicular to the chuck driving interface.

Although all driving force is transmitted through the driving interfaces 22, 23, it is desirable to be able to fasten chuck 20 to spindle adapter 35. This is accomplished in this preferred embodiment using a collar 18 press-fit onto or welded to the driven end 14 of the chuck 20. Roll pins 60 secure collar 18 to spindle adapter 35 as described below.

The collar 18 defines a generally square aperture 30 for insertion of the generally square male driving end 55. The collar 18 has four holes 28 formed in its side. The axes of holes 28 are normal to the axis of rotation 7. The holes 28 are equally spaced so that the axis of each hole is colinear with the axis of the opposing hole. The driving end 55 of the spindle adapter 35 likewise has four holes 29 formed therein. These holes 29 are so positioned that when interfaces 22, 23 are juxtaposed with the keys and keyways engaged, the axes of the holes 29 are colinear with the axes of the corresponding holes 28. Roll pins 60 can then be inserted into the aligned holes 28, 29 thereby securing the spindle adapter 35 to the chuck 20. This alignment also allows a roll pin 60 to be driven into one hole 28 and removed by continuing to drive it in the same direction until it emerges through the opposing hole 28'.

However, while holes 28 are sized to provide a snug fit when roll pins 60 are inserted therein, holes 29 are sized slightly larger so that the fit of roll pins 60 within holes 29 is loose. This allows for looser production tolerances. This is permissible in this embodiment as well as the embodiment discussed below since the only purpose for securing the chuck 20 to the spindle adapter 35 is to hold the chuck in place during such operations as the removal of the log from the chuck. No rotational force is transmitted through roll pins 60 in either embodiment. The use of roll pins 60 has proven to be both a convenient and a cheap fastening method. It is especially advantageous over threaded connectors since the presence of sap and resin does not hamper their insertion and removal as it does with threaded connectors. Also roll pins 60 work equally as well regardless of the direction of rotation.

Now the log engaging portion 16 of the chuck 20 will be discussed. Referring to FIG. 1, log engaging portion 16 has three arcuate teeth 46, all three teeth meeting along the axis of rotation 7 and extending outwardly therefrom. These teeth 46 are formed so the concave (or leading) face 48 is towards the direction of rotation 50. This configuration of the teeth helps to reduce the splitting of logs along natural radial fracture zones as the teeth are forced into the ends of a log.

Another characteristic of the teeth 46 of the preferred embodiment is that they define a self-cleaning recess at base 40. The base 40 slopes radially outwardly from the axis 7 and longitudinally towards the driven end 14. This self-cleaning recess insures that any debris built up during a cutting operation will be extruded away from the base of the teeth by the wiping action occurring when the next log is mounted between the chucks.

Referring now to FIG. 4, an alternative preferred embodiment is shown. The major distinction between it and the embodiment shown at FIG. 2 is the addition of a second, cylindrically shaped, driving interface extending parallel to the axis of rotation.

A cylindrical driving interface 61 is formed circumferentially about the generally cylindrical driving end (or chuck engaging portion) 55' by forming spline slots 70 on the driving end 55' extending parallel to the axis of rotation 7.

The collar 18' defines a cylindrical aperture 30' for insertion of the generally cylindrical male driving end 55'. Within the aperture 30' are complementary splines 68. These splines define a cylindrical driven interface 62.

When the driven end 55' is fully inserted within the aperture 30' with the splines 68 and spline slots 70 rotatably engaged, rotational force can be transmitted from the spindle adapter 35', through the cylindrical driving and driven interfaces 61, 62, through the collar 18', to the chuck 20. Of course rotational force is also transmitted across interfaces 22, 23. This use of two driving interfaces often permits greater force to be transmitted to the chuck than is possible using either interface alone.

I claim:

1. A chuck assembly for rotating a log along an axis from a lathe spindle during cutting of veneer, said chuck assembly comprising:
    a chuck;
    a spindle adapter for driving said chuck;
    said spindle adapter having a lathe driven portion and a chuck engaging portion;
    means extending between said spindle adapter and chuck for holding said spindle adapter and chuck together;
    means for attaching said lathe driven portion to said lathe whereby rotational motion is imparted from the lathe to the spindle adapter;
    said chuck including a log engaging portion and a spindle adapter engaging portion;
    said holding means being rigidly attached to said spindle adapter engaging portion of said chuck;
    said holding means and said chuck engaging portion of said spindle adapter defining therebetween a cylindrical driving interface;
    said cylindrical driving interface defining complementary splines and spline slots whereby rotational motion is imparted by the spindle adapter through the holding means to the chuck;
    said chuck engaging portion of said spindle adapter and said spindle adapter engaging portion of said chuck terminating in and defining therebetween a driving interface along a plane substantially normal to the axis of rotation;
    said driving interface defining complementary keys and keyways interrupting said plane for imparting rotation motion between the chuck and spindle adapter.

2. The chuck assembly of claim 1 and wherein said key and keyway extend radially.

3. The chuck assembly of claim 1 and wherein said key and keyway include mating parallel sides.

4. The chuck assembly of claim 1 and wherein said driving interface defines a central aperture in said spindle adapter.

5. The chuck assembly of claim 1 and wherein the log engaging portion of said chuck extends across the axis of rotation.

6. A chuck assembly mounted on the lathe spindle of veneer cutting lathe used to hold logs during veneer cutting operations comprising:
    a spindle adapter having means for rigidly mounting said spindle adapter to the lathe spindle and a driving end;
    a chuck driven by said spindle adapter having means for gripping the log and a driven end;
    means for securing said chuck to said spindle adapter, said securing means being rigidly fixed to said driven end;
    said securing means defining a circular aperture with splines formed therein;
    said driving end being generally cylindrical with complementary spline slots for engagement with said splines whereby rotational force can be transmitted from said spindle adapter, through said securing means, to said chuck;
    said driven end defining a chuck driving interface normal to the axis of rotation;
    said driving end defining a spindle adapter driving interface normal to the axis of rotation; and
    said driving interfaces so formed so that when said interfaces are juxtaposed, rotational driving force can be transmitted from the lathe spindle, through the spindle adapter, to the chuck whereby the log is rotated.

* * * * *